April 17, 1934.    G. G. KRUESI ET AL    1,955,505
DIRECTIONAL RADIORECEIVER
Filed Dec. 15, 1930

Inventors
Geoffrey Gottlieb Kruesi
Gerhardt Fisher
By Lyon & Lyon
Attorneys

Patented Apr. 17, 1934

1,955,505

UNITED STATES PATENT OFFICE

1,955,505

DIRECTIONAL RADIORECEIVER

Geoffrey Gottlieb Kruesi, Alhambra, and Gerhardt Fisher, Los Angeles, Calif., assignors, by mesne assignments, to Bendix Aviation Corporation, South Bend, Ind., a corporation of Delaware Application December 15, 1930, Serial No. 502,275

10 Claims. (Cl. 250—11)

Our invention relates to directional radio receivers and has particular reference to radio receiving devices employed in connection with direction finding apparatus for navigation purposes.

Radio compasses and direction finders for navigation purposes have been suggested but prior devices have depended for their operation upon the reception of a special radio wave or a wave which has a predetermined modulation impressed thereon, requiring that the compass shall be employed in connection with a transmitting station specially designed for the propagation of the desired wave, while other forms of radio direction finders have depended upon a local generator to be carried by the device upon which the receiving device is employed.

It is an object of our invention to provide a radio direction finding device which may be used in connection with any transmitted radio wave provided such wave is modulated but not depending upon any specific modulation of such wave.

Another object of our invention is to provide a radio direction receiving device which will operate upon any modulated radio wave and which requires no local source of alternating current for its operation.

Another object of our invention is to provide a radio direction finding device in which an indicating instrument will be so affected as to directly indicate the direction and degree with which the ship, airplane or other device on which the instrument is employed varies from its proper course.

Figure 1:
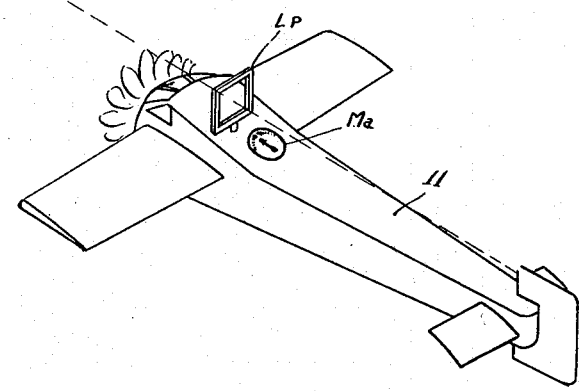

Our invention will be described with reference to the accompanying drawing in which Fig. 1 is a diagrammatic view illustrating our device adapted to an airplane and showing the relation of the plane to a transmitting station when the ship is on a desired course.

Figure 2:
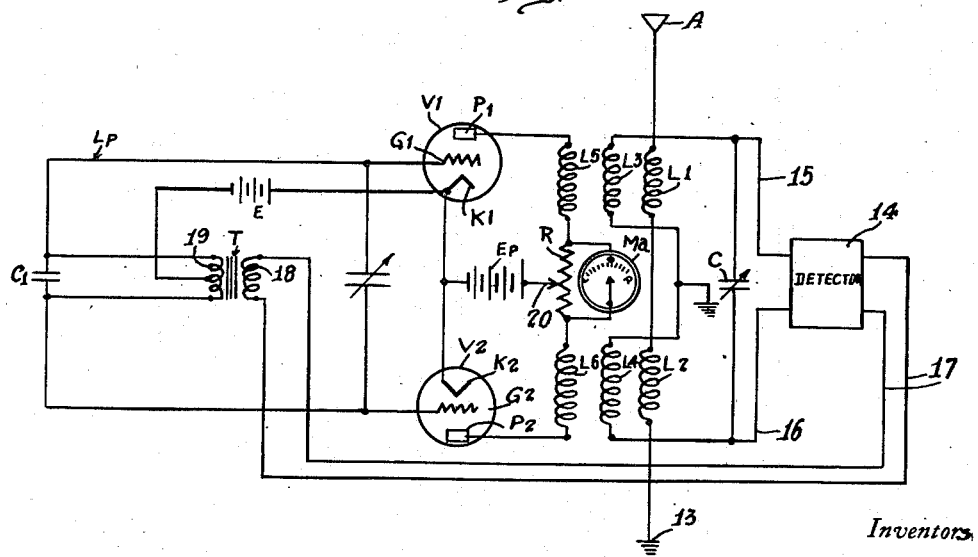

Fig. 2 is a diagrammatic view showing the wiring diagram employed in the practice of our invention.

Referring to the drawing, we have illustrated in Fig. 1 a radio transmitting station 10 which may produce a radio current of any desired frequency having any desired modulation impressed thereon. An airplane 11 is illustrated as being provided with a loop aerial $L_p$ and an indicating instrument $M_a$ which may be located at any suitable position in view of the pilot of the airplane. As will be hereinafter described, the indicating instrument $M_a$ will have its needle pointed toward a central or zero position upon the instrument when the airplane is directed in the line connecting the plane with the transmitting instrument, this line being illustrated in Fig. 1 by a dotted line 12.

Referring to Fig. 2 it will be observed that the airplane is provided in addition to the loop aerial $L_p$ with an open antenna A connected to ground at 13 through a pair of coils L1 and L2. The coils L1 and L2 are illustrated as being respectively coupled to a pair of coils L3 and L4 connected in circuit with a radio frequency amplifier and detector 14. If desired, a tuning capacitor C may be connected across conductors 15 and 16 which constitute the input conductors for the radio detector 14 in order to permit the input circuit to be tuned to any desired frequency.

The output circuit 17 of the detector 14 is illustrated as being connected to opposite ends of a primary winding 18 on an audio frequency transformer T, the secondary 19 of which is illustrated as having its opposite ends connected to the loop $L_p$ with a capacitor C1 connected between the ends of the secondary 19.

The mid-point of the secondary winding 19 on transformer T is illustrated as being connected through a source of biasing potential E to both of the cathodes K1 and K2 respectively of a pair of vacuum tubes V1 and V2.

Opposite ends of the loop $L_p$ are illustrated as being connected respectively to the control grid G1 of tube V1 and grid G2 of tube V2, so that the potential received by the loop $L_p$ will be applied to the grids of these tubes in equal amplitude but 180° out of phase with each other.

The plate circuit for tube V1 is illustrated as being connected through a coil L5 which is coupled to the coils L3 and L1, the plate circuit extending from the coil L5 through a variable resistor R and through a source of plate potential $E_p$ to the cathode K1.

A similar circuit is provided for the plate P2 of the tube V2, this circuit including a coil L6 coupled to coils L4 and L2, the circuit extending through another portion of the variable resistor R and through the source of plate potential $E_p$ to the cathode K2. If the directional characteristics of the coils L5 and L1 are selected such that current flowing in one direction in the coil L5 will induce current in the coil L1 in the same direction and similar directional characteristics are selected for the coils L6 and L2, it will be apparent that the induced currents in coils L1 and L2 will oppose each other.

The indicating instrument $M_a$ is illustrated as being a milliammeter connected to opposite ends of the variable resistor R.

With the receiving device as illustrated in Fig. 2 and with no radio current received by either the antenna A or the loop Lp, the connector 20 to the variable resistor R should be so adjusted as to cause the plate current in the plate circuit for tube V1 to just balance the plate current in the tube V2 so that the indicating instrument Ma will come to rest at a zero reading.

Assuming now that a wave of radio frequency modulated by any desired frequency, such as the usual broadcast modulation or by any desired constant modulation which may be produced by the transmitting station 10, is received by the antenna A, this radio frequency will be passed to the coils L1 and L2. By virtue of the inductive coupling between coils L1 and L3 and the coils L2 and L4, this radio frequency will be supplied to the amplifier and detector 14 to produce in the output circuit 17 thereof a current having the modulation frequency, that is, the antenna A will receive three frequencies W, W+V, and W−V. The resulting frequency in the output circuit 17 will be a current having frequency V, and since the antenna A is non-directional, the amplitude of the current in the output circuit 17 thus produced will not be affected by any deviation of the airplane from a straight line to the transmitting station.

The low frequency V is thus supplied to the primary winding 18 of the transformer T and is thus impressed upon both of the grids G1 and G2. However, due to the connection of the secondary winding 19 to the loop Lp (and thus to the grids G1 and G2) the current and tube V1 will be 180° out of phase with the current supplied to tube V2.

The bias of the potential E on the grids G1 and G2 should be selected so that these grids will operate on a curved portion of their grid voltage-plate current curves so that during one-half cycle at frequency V, tube V1 will have its grid G1 strongly positive thus increasing the plate current in the plate circuit for this tube while at the same time the grid G2 of tube V2 will be supplied with negative current, thus causing a much smaller plate current to flow in the plate circuit of the tube V2.

However, during the next half cycle, these conditions will be reversed, that is, the plate current in tube V2 will be increased greatly while the plate current in tube V1 will be increased only slightly. With the proper plate voltage and the proper setting of the connector 20 of the variable resistor R, the larger plate current in tube V1 during one-half cycle will be balanced by an equally large plate current in the tube V2 during the other half cycle. Since the mechanical construction of an indicating instrument is such that it cannot move in response to the frequency V, the equal and opposite plate currents will balance each other so that the instrument Ma will remain in zero position.

Now assuming that the loop Lp also receives current from the transmitting station 10, the connection of the loop Lp to the grids G1 and G2 causes the tubes V1 and V2 respectively to act as radio frequency amplifiers to pass such radio frequency to the coils L5 and L6 respectively. During one-half cycle at frequency V the low frequency current from the detector 14 causes the grid of one of the tubes to be strongly positive while the other grid is less positive. Hence the tube, the grid of which is more strongly positive, will act as a more efficient radio frequency amplifier than will the other tube.

Assuming for example that at a given instance the low frequency current V is causing the grid G1 of the tube V1 to be more strongly positive than the grid G2 of the tube V2, a greater radio frequency current will flow through the coil L5 than will flow through the coil L6.

The coils L1, L3 and L5 constitute a radio frequency transformer of which coil L3 is the output coil. Hence under these conditions a current will be induced in the coil L3 greater than the current induced in this coil by the antenna current alone.

Since the amplitude of the modulation follows the amplitude of the radio frequency current, the resulting current at frequency V from detector 14 will be increased during this half cycle at frequency V.

However, during the second half cycle at frequency V the opposite condition will exist. That is, the grid of the tube V2 now is more strongly positive than the grid of the tube V1. Thus during this second half cycle a greater radio frequency current will be supplied through the coil L6 than is supplied through the coil L5.

Since the current in coil L6 flows oppositely relative to the antenna current than does the current in coil L5 relative to the antenna current, the result will be an output from coil L4 amounting to the subtraction of the loop current from the antenna current. In other words, during the second half cycle the output current supplied to the detector 14 would be much less than during the first half cycle. Hence the output current from the detector at frequency V will be great during one-half cycle and less during the next half cycle, as distinguished from the condition when only antenna current was present in which the current frequency V was equal in both half cycles.

The resulting current at frequency V being supplied to the grids of both tubes V1 and V2, with a 180° phase difference between the tubes, will cause the average plate current in one of the tubes (for example tube V1) to be increased, while the average plate current in the tube V2 will be decreased. Hence a greater direct current component will flow through the upper portion of the variable resistor R while a smaller direct current component will flow through the lower portion of the resistor R, and the needle of the indicating instrument Ma will come to rest at a point proportional to the difference between the currents in the two portions of the resistor R.

Assuming, however, that the loop Lp is angled a similar amount, but to the opposite side of the straight line to the transmitting station, it will be apparent that the loop current will now be 180° out of phase with such current when the loop was on the opposite side of the straight line. Hence the loop current is now 180° out of phase with the antenna current so that the addition of the radio frequency currents in loop and antenna occurs in coils L2, L4, L6, while subtraction occurs in the coils L1, L3, L5. The resulting detected current at frequency V will have the same wave form as when the loop was angled in the opposite direction but the phase of this current is reversed.

Hence in this case the average plate current from tube V2 will be greater than the average plate current from tube V1 so that under these conditions a greater current flows through the lower portion of resistor R while a lesser current flows through the upper portion of resistor R, and the needle will come to rest at a point proportional to the difference between these currents; but the needle will now be on the opposite side of the zero point than when the loop was angled in the opposite direction.

Thus, the angle of deflection of the loop $L_p$ will be indicated by the instrument $M_a$, while if the airplane is directly on its course, that is, with the plane of the loop $L_p$ at right angles to the straight line to the transmitting station, the indicating instrument will read zero.

It will be observed that it is essential to our system that some frequency is introduced into our instrument which is different from radio frequency of the transmitted wave, in order that the variation of tubes V1 and V2 as radio frequency amplifiers shall occur. This different frequency may, and preferably is, a part of the transmitted signal, though it is apparent that such different frequency may be introduced locally in our instrument.

In other words, our system will operate upon any transmitted wave form either an interrupted continuous wave, or a modulated continuous wave, in which the interruptions and modulations occur at the transmitting station, while our instrument will work equally as well upon an unmodulated or uninterrupted continuous wave if a local source of frequency is provided in our instrument. Such local frequency may be introduced as by providing a superheterodyne receiver as the detector 14, or providing any other suitable means for introducing local frequency into the received signal.

It will be also apparent that the frequency V, that is, the modulation frequency, may be varied as in the usual broadcast transmission without affecting the operation of the indicating instrument, since the instantaneous value of the modulation operates both upon the antenna and upon the loop.

Thus by determining the location of any transmitting station to which the receiving device is tuned, a pilot may determine whether or not he is flying the plane toward that location and may determine the angle of deviation of the plane from that course.

It will be further observed that if the indicating instrument $M_a$ is so connected that when the plane is flying toward the transmitting station and is angled to the left of the straight line, the indicating needle points to the right of the zero position, the pilot will understand that he must swing his plane to the right in order to bring it back into its course. However, if the plane is flying away from the transmitting station and is angled to the right of the straight line to the transmitting station, the indicating instrument will also point to the right, so that if the pilot should move his plane to the right under these conditions to bring it back into its course, he would find that the needle would have further deflected to the right instead of returning to the zero position. In this way the pilot may determine whether or not he is flying toward or away from the transmitting station to which his receiver is tuned.

Although, in the system disclosed in the drawing, the loop is connected to the tubes V1 and V2, it will be apparent to those skilled in the art to which the invention appertains, that the system may be operated equally as well if the antenna and loop connections are reversed, i. e., the directional antenna or loop may be employed and connected to supply its received current to the detector 14 and the non-directional or straight antenna may be connected to the vacuum tubes either directly or by coupling. The fundamental principle involved herein lies in the fact that the directional and non-directional antennæ be coupled with each other so that the function of adding and subtracting the received currents may occur. Such function will occur regardless of whether the directional antenna or the non-directional antenna is connected to the vacuum tubes.

While we have illustrated and described the preferred embodiment of our invention, we do not desire to be limited to any of the details shown herein except as defined in the appended claims.

We claim:

1. A direction finding device comprising means for receiving a modulated radio wave from a transmitting station, a second means for simultaneously receiving the said radio wave and having the characteristic of varying the strength of the signal received thereby in some proportion to the angle of deviation of said second means from a straight line to the transmitting station, means coupling said two receiving means together at two points, one to add the received signals and the other to subtract the received signals, means for detecting the two resulting signal strengths, and indicating means operable by the detected signal strengths to indicate the said angle of deviation.

2. A direction finding device comprising means for receiving a modulated radio wave from a transmitting station, a second means for simultaneously receiving the said radio wave and having the characteristic of varying the strength of the signal received thereby in some proportion to the angle of deviation of said second means from a straight line to the transmitting station, a first transformer and a second transformer, one coil of each of which is connected in circuit with said first receiving means, a pair of vacuum tubes the input circuits of which are connected to said second receiving means, a coil of said first transformer in the output circuit of one tube, a coil of said second transformer in the output circuit of said other tube, the coupling of said first transformer having a directional characteristic opposite to that of the second transformer, means for detecting the resultant current in said first transformer and in said second transformer, and an indicating means operable by the detected currents for indicating the said angle of deviation.

3. A direction finding device comprising means for receiving a modulated radio wave from a transmitting station, a second means for simultaneously receiving the said radio wave and having the characteristic of varying the strength of the signal received thereby in some proportion to the angle of deviation of said second means from a straight line to the transmitting station, a first transformer and a second transformer one coil of each of which is connected in circuit with said first receiving means, a pair of vacuum tubes the input circuits of which are connected to said second receiving means, a coil of said first transformer in the output circuit of one tube, a coil of said second transformer in the output circuit of said other tube, the coupling of said first transformer having a directional characteristic opposite to that of the second transformer, means for detecting the resultant current in said first transformer and in said second transformer, means for supplying said detected current to said tubes with a phase difference of 180° between said tubes, and an indicating means connected to the output circuits of both said tubes for indicating said angle of deviation.

4. A direction finding device comprising means for receiving a modulated radio wave from a transmitting station, a second means for simultaneously receiving the said radio wave and having the characteristic of varying the strength of the signal received thereby in some proportion to the angle of deviation of said second means from a straight line to the transmitting station, a transformer having three coils one of which is connected to the first receiving means, the second of which is connected to said second receiving means and the third of which is connected to a detector, a second transformer having three coils, the first of which is connected to said first receiving means, the second of which is connected to said second receiving means, the coupling between said two coils being opposite to that of the corresponding coils of said first transformer, and the third coil being connected to said detector, and means connecting the output circuit of said detector to an indicating instrument to indicate the said angle of deviation.

5. In a direction finding device, a pair of means for receiving the same modulated radio wave from a transmitting station, one of said means having the characteristic of varying the strength of the received signal in some proportion to the angle of deviation of said receiver from a straight line to the transmitting station, a pair of means for coupling said two receivers together, the coupling in one of said means being 180° out of phase with that of the other of said means, means for detecting the two resultant signal strengths to indicate the said angle of deviation and means operably responsive to said signal strength for measuring said angle of deviation.

6. In a direction finding device, an antenna and a loop, both for receiving a modulated radio wave from a transmitting station, a pair of vacuum tubes the input circuits of which are connected to said loop in phase with each other, means coupling the output circuit of one tube with the antenna in phase with the directly received current thereon, means coupling the output circuit of said other tube to said antenna out of phase with the current therein, means for detecting the resultant low frequency current from said two couplings, means for supplying said low frequency current to the input circuits of said tubes with a phase difference of 180° between said tubes, and means connected in the output circuits of both tubes for measuring the difference between the current produced in said tubes.

7. In a direction finding device, an antenna for receiving a modulated radio wave from a transmitting station, a circuit therefor, means coupled to said antenna circuit for detecting the low frequency current from said wave, a pair of vacuum tubes, means connecting said detecting means and said tubes to supply said low frequency current to the input circuits of said tubes with a 180° phase difference between said tubes, an indicating instrument connected in the output circuit of both tubes to receive the opposed equal currents from said tubes, a loop, means coupling said loop to said antenna circuit at two points, one to add the two currents in loop and antenna and one to subtract the two currents whereby the output current from one tube varies in amplitude from that from the other dependent upon the angle of deviation of the loop from a straight line to the transmitting station and is greater in one tube or the other dependent upon whether the loop is angled to one side or the other of said straight line.

8. A direction finding device comprising a pair of means for receiving a radio wave of given frequency from a transmitting station, one of said means having the characteristic of varying the strength of the received signal in some proportion to the angle of deviation of said receiver from a straight line to the transmitting station, two vacuum tubes, the input circuits of which are connected to one of said receivers, means for producing from said received wave a current having a frequency differing from said given frequency, means for supplying said second frequency current to the input circuits of said tubes with a phase difference of 180° between said tubes, means coupling the output circuits of said tubes to the other of said receivers at two points, the coupling at one of said points differing in phase from that of the other point, and means for measuring the difference in signal strength resulting from the two couplings to indicate the said angle of deviation.

9. A method of indicating the direction of incoming modulated radio frequency waves, which method comprises receiving said modulated waves in two separate but similar sets, varying the amplitude of one set in accordance with the deviation from a straight line between the point of reception and the transmitting station, combining said sets at two points whereby they are added at one point and subtracted at the other point, detecting the two resulting waves to produce an asymmetrical alternating current of a frequency corresponding to the modulation of the waves, deriving from the asymmetrical alternating current two direct currents which vary differentially in accordance with the deviation, combining said differential direct currents, and indicating the resultant current.

10. A method of indicating the direction of incoming radio frequency waves, which method consists in simultaneously receiving said waves in two separate but similar sets, deriving from the received waves a current having a frequency different from the given frequency, causing said second frequency current to periodically affect one of the sets of said waves, combining the affected set of waves with the unaffected set differentially at two points whereby they are added at one point and subtracted at the other, combining the two resulting currents, and indicating the resultant current thus produced.

GEOFFREY GOTTLIEB KRUESI.
GERHARDT FISHER.